US011030645B2

(12) United States Patent
Haydock

(10) Patent No.: US 11,030,645 B2
(45) Date of Patent: Jun. 8, 2021

(54) CREATION AND DISTRIBUTION OF REVEAL-BASED MODULAR ADVERTISING UNITS

(71) Applicant: ZEMBULA, INC., Portland, OR (US)

(72) Inventor: Robert Jenkin Haydock, Portland, OR (US)

(73) Assignee: ZEMBULA, INC., Portland, OR (US)

(*) Notice: Subject to any disclaimer, the term of this patent is extended or adjusted under 35 U.S.C. 154(b) by 368 days.

(21) Appl. No.: 13/785,612

(22) Filed: Mar. 5, 2013

(65) Prior Publication Data

US 2014/0222552 A1 Aug. 7, 2014

Related U.S. Application Data

(60) Provisional application No. 61/761,174, filed on Feb. 5, 2013.

(51) Int. Cl.
*G06Q 30/02* (2012.01)
*G06F 40/14* (2020.01)

(52) U.S. Cl.
CPC ......... *G06Q 30/0246* (2013.01); *G06F 40/14* (2020.01); *G06Q 30/0241* (2013.01)

(58) Field of Classification Search
CPC .................. G06Q 30/0246; G06F 17/2247
See application file for complete search history.

(56) References Cited

U.S. PATENT DOCUMENTS

| 8,667,425 | B1* | 3/2014 | Burke | G06F 3/04883 |
| | | | | 715/863 |
| 2008/0139181 | A1* | 6/2008 | Lokshin | 455/414.1 |
| 2009/0235312 | A1 | 9/2009 | Morad | |
| 2010/0121719 | A1* | 5/2010 | Blair | G07F 17/329 |
| | | | | 705/14.64 |

(Continued)

OTHER PUBLICATIONS

Subramanya et al., "User Interfaces for Mobile Content" (published in Computer, vol. 39, No. 4, pp. 85-87, Apr. 2006) (Year: 2006).*

(Continued)

*Primary Examiner* — Abhishek Vyas
*Assistant Examiner* — Patrick Kim
(74) *Attorney, Agent, or Firm* — Alleman Hall Creasman & Tuttle LLP

(57) ABSTRACT

Non-transitory computer-readable media, systems, apparatus, and computer-implemented methods are described herein for facilitation of generation and selective provision of a modular advertising unit over a plurality of communication channels to a plurality of end user computing devices. In various embodiments, the modular advertising unit comprising may include a first graphic configured to be operable by a user with an end user computing device to reveal, in place of at least a portion of the first graphic, a second graphic to the user. In various embodiments, the modular advertising unit may also include instructions configured to cause the end user computing device, in response to execution of the instructions by the end user computing device, to automatically provide a report, to the computing device or another computing device associated with an advertising entity, about operation of the first graphic.

19 Claims, 12 Drawing Sheets

(56) References Cited

U.S. PATENT DOCUMENTS

| | | | |
|---|---|---|---|
| 2011/0187497 A1* | 8/2011 | Chin ........................ | H04L 9/32 |
| | | | 340/5.54 |
| 2011/0264491 A1* | 10/2011 | Birnbaum et al. ........... | 705/14.4 |
| 2011/0282725 A1* | 11/2011 | Chatterjee et al. ........ | 705/14.24 |
| 2011/0307515 A1* | 12/2011 | Chen ...................... | G06Q 30/02 |
| | | | 707/770 |
| 2012/0054001 A1* | 3/2012 | Zivkovic ............ | G06Q 30/0207 |
| | | | 705/14.1 |
| 2012/0252410 A1* | 10/2012 | Williams ...................... | 455/411 |
| 2014/0006121 A1* | 1/2014 | Barker ............... | G06Q 30/0212 |
| | | | 705/14.14 |

OTHER PUBLICATIONS

European Patent Office, European Search Report, Patent Office Correspondence, dated Sep. 4, 2014, European Patent Office, Munich, Germany.

* cited by examiner

CREATION AND DISTRIBUTION OF REVEAL-BASED MODULAR ADVERTISING UNITS

RELATED APPLICATION

This application claims benefit of priority from Provisional Application Ser. No. 61/761,174, filed Feb. 5, 2013, which specification is fully incorporated herein by reference.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Digital media content such as modular advertising units may be generated and/or distributed to maximize a likelihood of user engagement. For example, a modular advertising unit may be inserted into a search engine webpage, e.g., as a banner in the margin, in the hope that a user will engage the modular advertising unit. In some instances, a user may engage a modular advertising unit simply by clicking on it. However, other modular advertising units may be interactive. For example, a modular advertising unit may come in the form of a simple "game" that a user may "play." In various embodiments, such modular advertising units may be implemented using one or more technologies, such as Adobe Flash or variants of the Hypertext Markup Language ("HTML"), such as HTML 5. Generation of interactive modular advertising units may be complex, particularly where the advertising entity wishes to collect data about users' interaction with modular advertising units.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION OF VARIOUS EMBODIMENTS

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
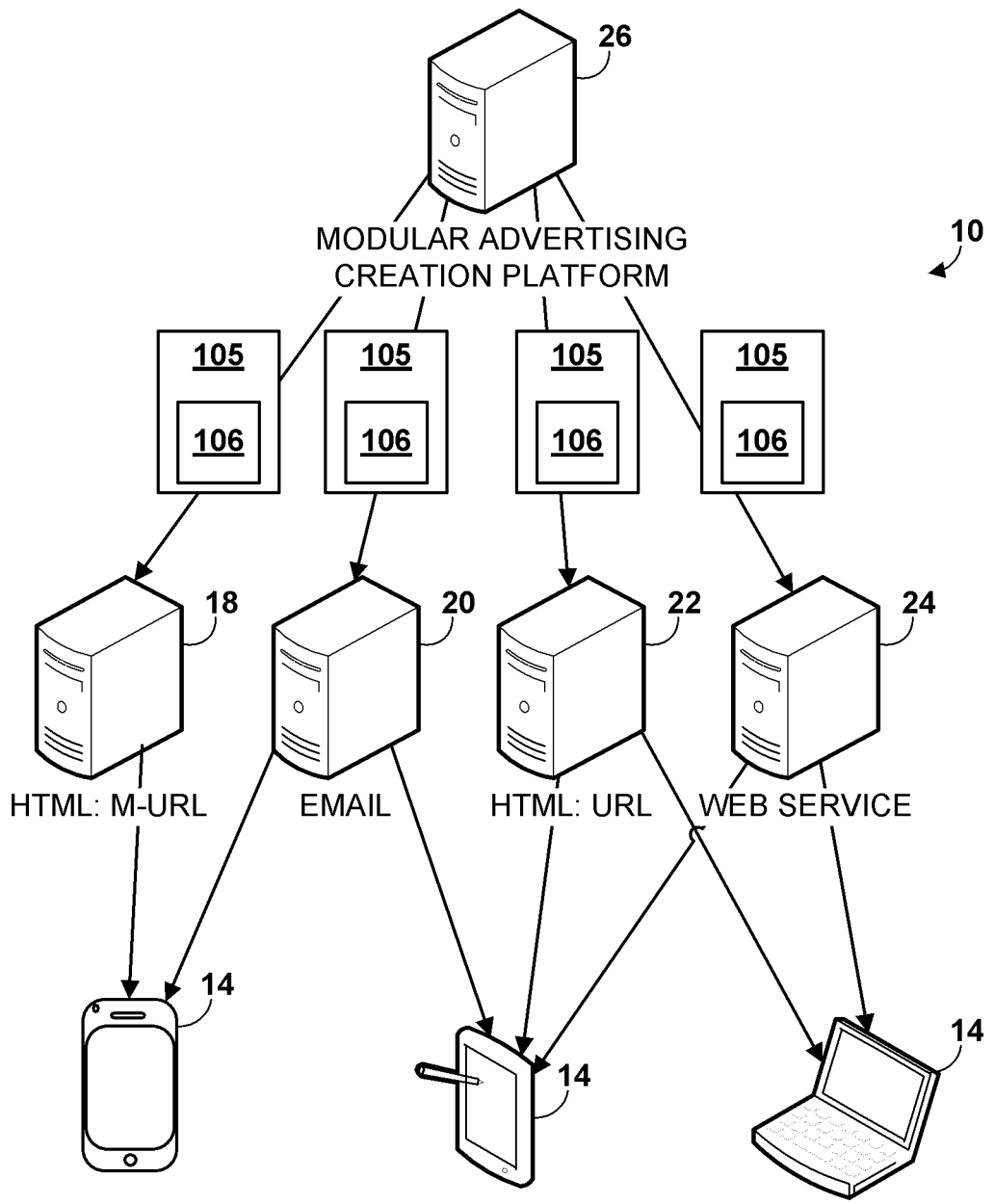
FIG. 1 depicts an example arrangement over which modular advertising units may be distributed and consumed by users, in accordance with various embodiments.

Various embodiments are described herein for simplified creation and/or distribution of modular advertising units, and analysis of user interaction with modular advertising units. Referring to FIG. 1, an example arrangement 10 is depicted on which modular advertising units 105 may be created and/or distributed to end user computing devices 14, in accordance with various embodiments. End user computing devices 14 may come in a variety of forms, such as a smart phone, a tablet computer and a laptop computer, to name a few.

A variety of channels for distribution of modular advertising units 105 may be provided by a variety of intermediate host servers. For instance, a first web server 18 may be configured to serve a mobile webpage (indicated by "M-URL"). An email server 20 may be configured to distribute emails. A second web server 22 may be configured to serve a "regular" webpage, which may be displayed similarly regardless of whether it is displayed on a mobile device or other computer. An "other" server 24 may be configured to distribute other types of media content (into which modular advertising may be incorporated) to user computing devices, including but not limited to graphics, video, audio, text, social media data, and so forth. While shown as separate intermediate host servers in FIG. 1, it should be understood that one or more of these distribution channels may be provided by the same computing device or computing devices working in cooperation (e.g., a server farm). Moreover, distribution channels may be defined in ways other than by server type. For example, a sports-themed webpage may be considered a different distribution channel than a music-themed webpage, even if the two pages are served by the same computing device.

A modular advertising creation platform 26 may facilitate generation and/or selective distribution of modular advertising units 105 over the plurality of communication channels, in accordance with various embodiments. In FIG. 1, for instance, modular advertising creation platform 26 may be used to create and distribute modular advertising units 105 having hidden messages that may be revealed upon alteration of a first graphic 106 (described below) to intermediate host servers 18-24. Intermediate host servers 18-24 in turn may make modular advertising units 105 available for push and/or pull to end user computing devices 14.

In various embodiments, modular advertising creation platform 26 may be configured to adapt different instances of modular advertising units 105 for deployment using different technologies. For example, an instance of a modular advertising unit created, e.g., by modular advertising creation platform 26, for distribution, e.g., by first web server 18, to mobile devices having relatively small displays may include less text and/or graphics than another instance of the same modular advertising unit 105 created for distribution to devices having relatively large displays, such as desktop, laptop or tablet computers. As another example, instances of modular advertising unit 105 destined for use with touch-screen display devices (e.g., smart phone, tablet computer) may be configured, e.g., by modular advertising creation platform 26, differently than instances destined for other types of devices, such as a laptop computer. Additionally, instances of a modular advertising unit 105 distributed over lower bandwidth channels may be configured, e.g., by modular advertising creation platform 26, to include less data than instances distributed over higher bandwidth channels.

In various embodiments, such as where a single server is configured to provide multiple instances of modular advertising unit 105 configured for different technologies, the single server may select an instance of modular advertising unit 105 for provision to a user based at least in part on a type of computing device used by the user. For example, a web server (e.g., 18, 22) may selectively provide a user of a smart phone with an instance of modular advertising unit 105 designed for use with devices having relatively small screens. The same web server may provide another user with a computing device having a larger screen, such as tablet or laptop computer, with a different instance of the same modular advertising unit 105, e.g., with more textual and/or graphical content, a higher resolution, and/or interactive features that would not be suitable for implementation on a smart phone.

Figure 2:
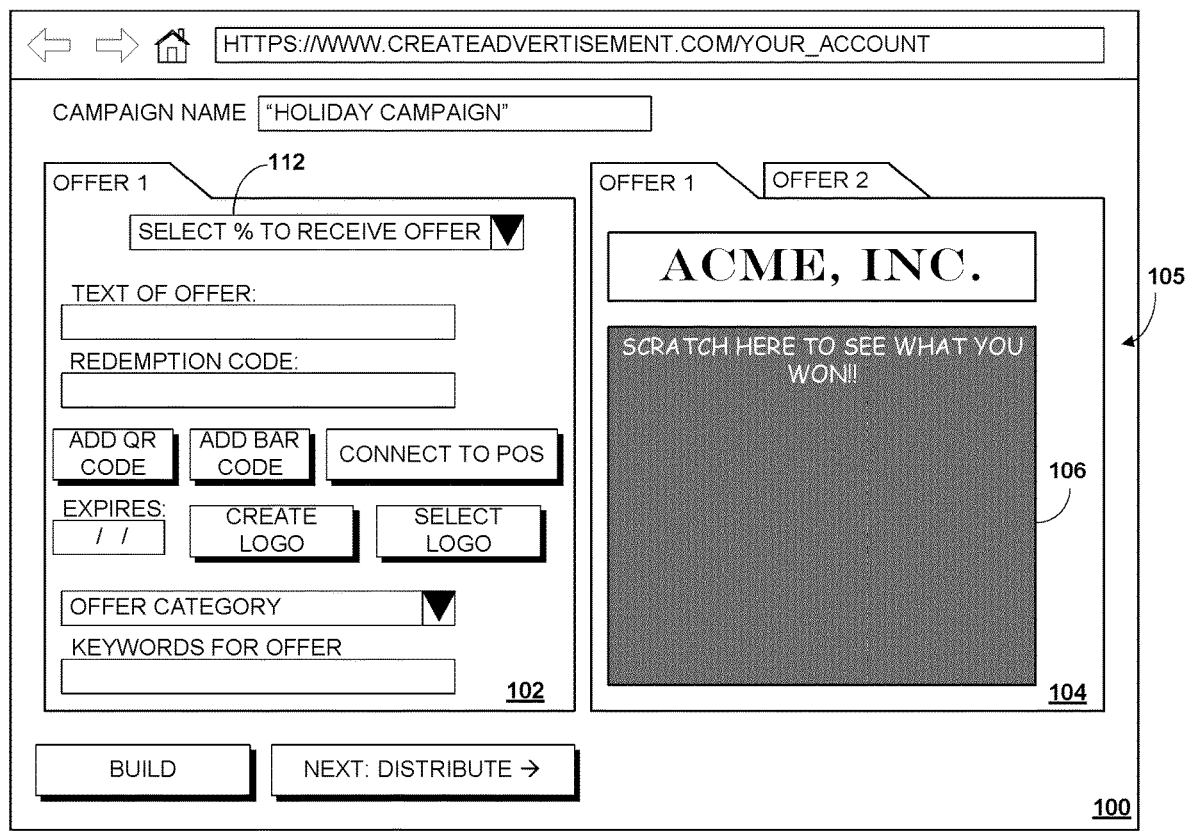
FIG. 2 depicts an example graphical user interface of a modular advertising creation platform usable to generate and/or distribute modular advertising units, in accordance with various embodiments.

FIG. 2 depicts an example graphical user interface ("GUI") 100 that may be presented for user operation by modular advertising creation platform 26, in accordance with various embodiments. In this example, GUI 100 takes the form of a webpage accessible with a web browser by using a Universal Resource Locator ("URL," "http://createadvertisement.com/your_account" in this example). However, GUI 100 may come in various other forms, such as part of a standalone application for desktop computers, laptop computers, tablet computers, smart phones, and so forth. In various embodiments, modular advertising creation platform 26 and/or GUI 100 may be "self-serve." For instance, they collectively may enable an individual or entity with relatively little technical expertise to create and distribute modular advertising units and/or to receive and analyze data about user interaction with distributed modular advertising units, all in-house, without engaging an advertising agency, sales person, designer, technical expert and/or marketing firm.

In various embodiments, GUI 100 may include an editing interface 102 for editing a modular advertising unit 105 and a viewing interface 104 for viewing the currently edited modular advertising unit 105. In some embodiments, editing interface 102 and viewing interface 104 may be a single interface.

In various embodiments, GUI 100 may facilitate creation, editing and/or distribution of a modular advertising unit 105 by providing an editable template that a user may modify to suit his or her own needs. For example, the user may be an employee of a vendor of a good or service, and may be tasked with creating a modular advertising unit 105 that, in response to user interaction, reveals a special offer for the good or service. The user may use GUI 100 to select a predefined template that the user may modify to fit a particular promotion or ad campaign.

Figure 3:
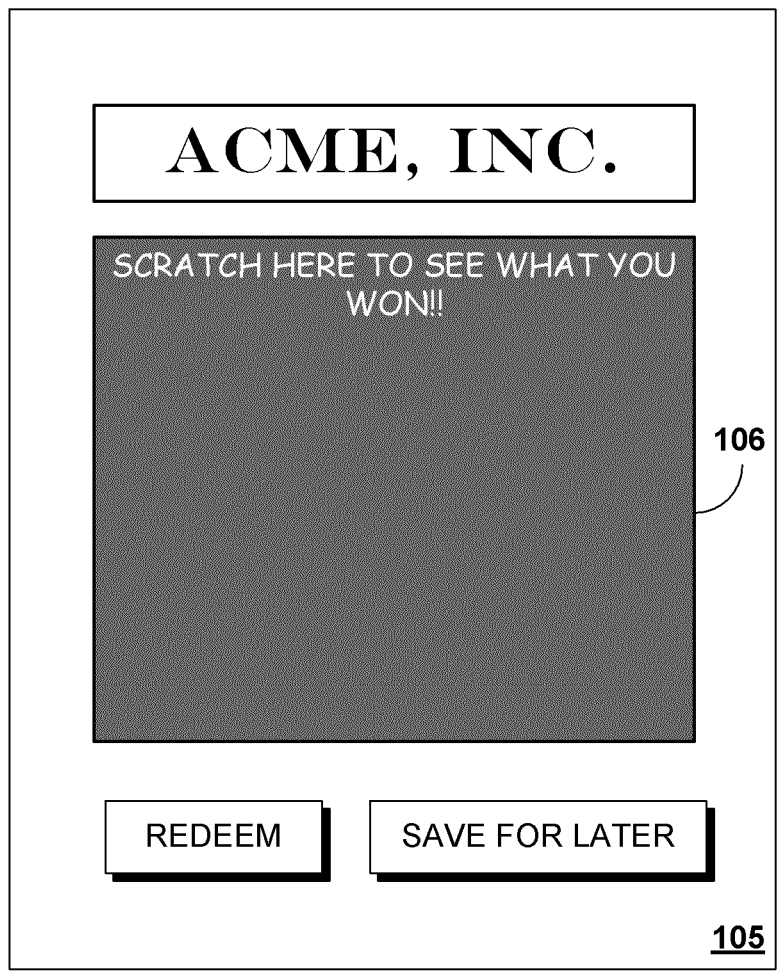
FIG. 3 depicts an example modular advertising unit in the form of a digital scratch off ticket, in accordance with various embodiments.
Figure 4:
FIG. 4 depicts the digital scratch off ticket of FIG. 3, with a portion of a graphic "scratched off" to reveal a second graphic that includes a message, in accordance with various embodiments.

Referring now to FIGS. 3 and 4, in various embodiments, modular advertising unit 105 may include a first graphic 106, shown in FIG. 3, which may be operable to reveal a second graphic 108, an example of which is shown in FIG. 4. Second graphic 108 may be configured to provide various types of information. In various embodiments, second graphic 108 may include a message or other information intended for consumption by a user. In some embodiments, second graphic 108 may include an offer, e.g., from a vendor of goods or services, that a user may redeem immediately or preserve for later redemption. In other embodiments, second graphic 108 may include a game token for use in an online game. First graphic 106 and/or second graphic 108 may include any combination of text and 2D or 3D graphics (still or animated). In some embodiments, second graphic 108 itself may be configurable by a consumer (as opposed to the party designing modular advertising unit 105) to include various types of graphics configured to facilitate redemption using various technologies, as will be described below.

As used herein, a "graphic" may be any computer-produced visual feature. First graphic 106 may be any computer-produced visual feature that conceals or creates the perception of concealment of second graphic 108. In some embodiments, first graphic 106 and/or second graphic 108 may be any combination of vector and/or raster-based graphical data, in any format (e.g., JPEG, PNG, GIF, etc.).

In various embodiments, first graphic 106 and/or second graphic 108 may be customizable to include any combination of text and graphics, such as a message intended for consumption by the user (e.g., "Scratch here to see a special offer").

In various embodiments, first graphic 106 may be operable to reveal second graphic 108 in place of at least a portion of first graphic 106 in various ways. In some embodiments, first graphic 106 may be operated by a user dragging a mouse pointer over first graphic 106 while holding down a mouse button (e.g., to mimic "scratching" or "wiping" off the graphical layer). In other embodiments, such as where a touch-screen is deployed, the user may swipe a finger across first graphic 106 to "scratch" or "wipe" it (or a portion thereof) away to reveal second graphic 108 to the user. In some embodiments, the act of "operating" first graphic 106 to reveal second graphic 108 may, in spite of the user's perception or "removing" first graphic 106, actually include drawing second graphic 108 in place of at least a portion of first graphic 106, e.g., following a user's movement of her fingers or a pointer over first graphic 106.

The drawings depict a scratch off ticket as an example of a modular advertising unit 105. However, other reveal-based modular advertising units 105 are possible. In various embodiments, first graphic 106 may depict a curtain, drapes, blinds, and so forth that a user may operate, e.g., by pulling up blinds with an upward swipe, or pulling curtains apart with two fingers on a touch-screen, to reveal second graphic 108. In some embodiments, first graphic 106 may depict a fortune cookie that a user may "crack," e.g., by tapping or swiping, to reveal second graphic 108. In some embodiments, first graphic 106 may depict a blanket that a user may "lift off" of a hidden item containing second graphic 108, e.g., by swiping the blanket off the item. In some embodiments, first graphic 106 may have a theme. For instance, at or near various holidays, first graphic 106 may depict a present or a candy wrapper that a user may "open," e.g., by swiping or tapping, to reveal second graphic 108.

In various embodiments, graphics such as first graphic 106 and/or second graphic 108 may not be statically packaged with modular advertising unit 105. Instead, modular advertising unit 105 may be configured with instructions (e.g., written in JavaScript, PreHypertext Processor ("PHP"), HTML 5, XML, etc.) that, when executed, cause an end user computing device 14 or an intermediate host server 18-24 to dynamically obtain first graphic 106 and/or second graphic 108. In various embodiments, this may occur contemporaneously with download of modular advertising unit 105 to end user computing device 14, contemporaneously with user interaction with first graphic 106, and so forth.

For example, modular advertising unit 105 may be configured with instructions that, when executed, cause end user computing device 14 to request second graphic 108 from a remote computing device. In embodiments, that remote computing device may be an intermediate host server 18-24. In some embodiments, that remote computing device may be the modular advertising creation platform 26. In some embodiments, the remote computing device itself may in turn request second graphic 108 another remote computing device, such as modular advertising creation platform 26 or another host server that hosts candidate graphics.

Regardless of what remote computing device receives the request for and provides second graphic 108, that remote computing device may stochastically select second graphic 108 from a plurality of candidate graphics, e.g., based on a plurality of corresponding probabilities. For instance, a creator of modular advertising unit 105 may decide that one particular graphic (e.g., with a particular offer or discount) should be revealed as second graphic 108 more often than others when a user operates first graphic 106. In various embodiments, GUI 100 of modular advertising creation platform 26 may include an interface 112 (e.g., a pull down menu interface) that may be used to adjust probabilities associated with multiple possible second graphics 108, before initial launch of modular advertising unit 105 or after. Those probabilities may thereafter be utilized by various computing devices, e.g., intermediate host servers 18-24, end user computing device 14, modular advertising creation platform 26, or another remote computing device, to stochastically select a second graphic 108 to be revealed in response to user operation of first graphic 106.

Suppose modular advertising creation platform 26 is the source of second graphic 108 for modular advertising units it creates and distributes, and that it is configured to stochastically select, as second graphic 108, GRAPHIC_A, GRAPHIC_B or GRAPHIC_C. Assume that, at the time of launch, the corresponding probabilities of these graphics being selected is 50%, 40% and 10%, respectively. In various embodiments, modular advertising creation platform may be configured to retrieve from a local or remote database, e.g., contemporaneously with download of modular advertising unit 105 to end user computing device 14 and/or at the moment a user operates first graphic 106, up-to-date probabilities associated with a plurality of second graphics 106. That way, if an entity that created or controls distribution of modular advertising unit 105 decides sometime after launch that the probability that GRAPHIC_C is revealed upon operation of first graphic 106 should be adjusted upwards, e.g., to 20%, the vendor may use GUI 100 to adjust GRAPHIC_C's probability accordingly. The probabilities of GRAPHIC_A and GRAPHIC_B may also be adjusted accordingly, either automatically (e.g., the 10% added to GRAPHIC_C's probability may be subtracted equally or proportionally from the probabilities of GRAPHIC_A and GRAPHIC_B to yield 100%) or manually. Thereafter, modular advertising creation platform 26 may retrieve the new probabilities (e.g., at the time of download or when first graphic 106 is removed) and stochastically select the message accordingly.

While the above example describes the stochastic selection being performed at modular advertising creation platform, in some embodiments, modular advertising unit 105 itself may include instructions that when executed, cause end user computing device 14 or intermediate host server to stochastically select second graphic from a plurality of candidate graphics. Those candidate graphics may be stored locally (e.g., packaged with modular advertising unit 105 or stored on an intermediate host server 18-24), or remotely (e.g., on modular advertising creation platform 26).

In various embodiments, an entity may change what graphics appear in modular advertising unit 105 at end user computing device 14 post-distribution in other ways. For example, first graphic 106 and/or second graphic 108 may be selected, e.g., by modular advertising creation platform 26, an intermediate host server 18-24, or end user computing device 14, based on a number of distributions, engagements, and/or redemptions. Such information may be obtained from various sources, such as modular advertising creation platform 26 based on reports (described below) received from end user computing devices 14.

In various embodiments, an entity such as a vendor may configure modular advertising unit 105, e.g., using modular advertising creation platform 26, to offer different discounts to different participants based on various data. For example, a participant may be provided a different variant of a modular advertising unit 105 depending on the number of modular advertising units distributed, the time the modular advertising units are distributed (e.g., an early morning user may get a better discount than a late afternoon user), the location of users obtaining the modular advertising units, other contextual information about the users (e.g., obtained from social networking services), number of modular advertising units distributed/engaged/operated/redeemed, and so forth. In various embodiments, an entity may configure modular advertising unit 105, e.g., using modular advertising creation platform 26, so that after a particular number of distributions, modular advertising unit 105 is no longer made available, e.g., by intermediate host servers 18-24.

In various embodiments, modular advertising unit 105 may be configured, e.g., by modular advertising creation platform 26, with instructions that, when executed, cause end user computing device 14 and/or an intermediate host server 18-24 to automatically report a variety of information to one or more computer systems associated with various entities. These various entities may include but are not limited to an entity that created or controls distribution of modular advertising unit 105 (e.g., using modular advertising creation platform 26), or any other entity that monitors distribution and/or use of modular advertising unit 105, such as an entity that is providing an offer conveyed in second graphic 108 of modular advertising unit 105. For example, a vendor responsible for creation/provision of modular advertising unit 105 may wish to receive information about distribution, engagement, and/or redemption of modular advertising unit 105.

Modular advertising unit 105 may include instructions that when executed, cause various computing devices provide various information to various other computing devices. In some embodiments, the information reported may include information about distribution channels used to distribute modular advertising unit 105, such as the URL of the webpage on which it was provided or keywords searched to reach the particular webpage.

Suppose an instance of modular advertising unit 105 in the form of a digital scratch off ticket is provided to a user in the margin of a search engine webpage. Perhaps the user had searched for a keyword that relates to subject matter of modular advertising unit 105. Modular advertising unit 105 may be configured with instructions that when executed, cause end user computing device 14 and/or an intermediate host server 18-24 to report, to a vendor making an offer conveyed by second graphic 108, that modular advertising unit 105 has been presented to a user in the margin of the webpage having a particular URL.

An entity receiving a report on which URLs users visited to obtain its modular advertising unit 105 may analyze whether distribution of modular advertising unit 105 over one particular webpage, or even webpages directed to particular categories of interest (e.g., sports, politics, food, travel, etc.), are more likely than others to result in a user operating first graphic 106 and/or otherwise engaging/redeeming second graphic 108. And as noted above, in some embodiments, modular advertising unit 105 may include instructions that when executed, cause end user computing device 14 and/or an intermediate host server 18-24 to report on what keywords were searched to result in a webpage being displayed with modular advertising unit 105 in the margin.

In various embodiments, modular advertising unit 105 may be configured with instructions that when executed, cause end user computing device 14 to report on other distribution channels (e.g., through intermediate host servers 18-24 in FIG. 1) through which instances of modular advertising unit 105 was distributed. This may facilitate analysis, e.g., by an entity such as a vendor that monitors distribution of modular advertising unit 105, of distribution channels through which instances of modular advertising unit 105 are distributed to a plurality of user computing devices. For example, the entity may analyze how many instances of modular advertising unit 105 were distributed via webpages (e.g., from intermediate host server 18 or 22) versus email (e.g., 20), as well as which instances (webpage or email) were more likely to be fully engaged. That way, the entity may determine that distribution of modular advertising unit 105 over one distribution channel is likely to yield a higher return on investment than distribution over another.

In various embodiments, modular advertising unit 105 may be configured with instructions that when executed, cause end user computing device 14 to report about user interaction with instances of modular advertising unit 105. In such case, the reported information may include information about detected operation of first graphic 106 and/or second graphic 108, including but not limited to time elapsed between presentment of modular advertising unit 105 to the user and the user causing the removal of first graphic 106 to reveal second graphic 108, or other consumption of and/or interaction with second graphic 108, such as whether the user "clicks through" the message or for how long the user interacts with second graphic 108 or modular advertising unit 105 in general.

In various embodiments, modular advertising creation platform 26 and/or GUI 100 may be configured to facilitate selection of distribution channels over which to distribute instances of modular advertising unit 105, e.g., based on the above-described analysis. For example, an entity that controls distribution of modular advertising unit 105 may learn that sports websites comprise a distribution channel that is more likely than others to be used by users likely to remove first graphic 106 and/or fully engage modular advertising unit 105. The entity may utilize GUI 100 to cause further instances of modular advertising unit 105 to be distributed over other sports-related distribution channels, such as email lists, Twitter® feeds, and so forth.

In various embodiments where second graphic 108 is an offer, various actions may be taken by the end user to respond to the offer, using various technologies. For example, upon operation of first graphic 106 to reveal second graphic 108, the user may have an opportunity to redeem an offer conveyed by second graphic 108, e.g., by clicking on second graphic 108 itself or by clicking on a button (e.g., the "REDEEM" button depicted in a number of the figures) or link that enables the user to redeem the offer by connecting with a social networking or other network service. In various embodiments, the user may be provided with the ability to share the offer with others, e.g., using social networking, email, text messaging, and so forth.

Figure 5:
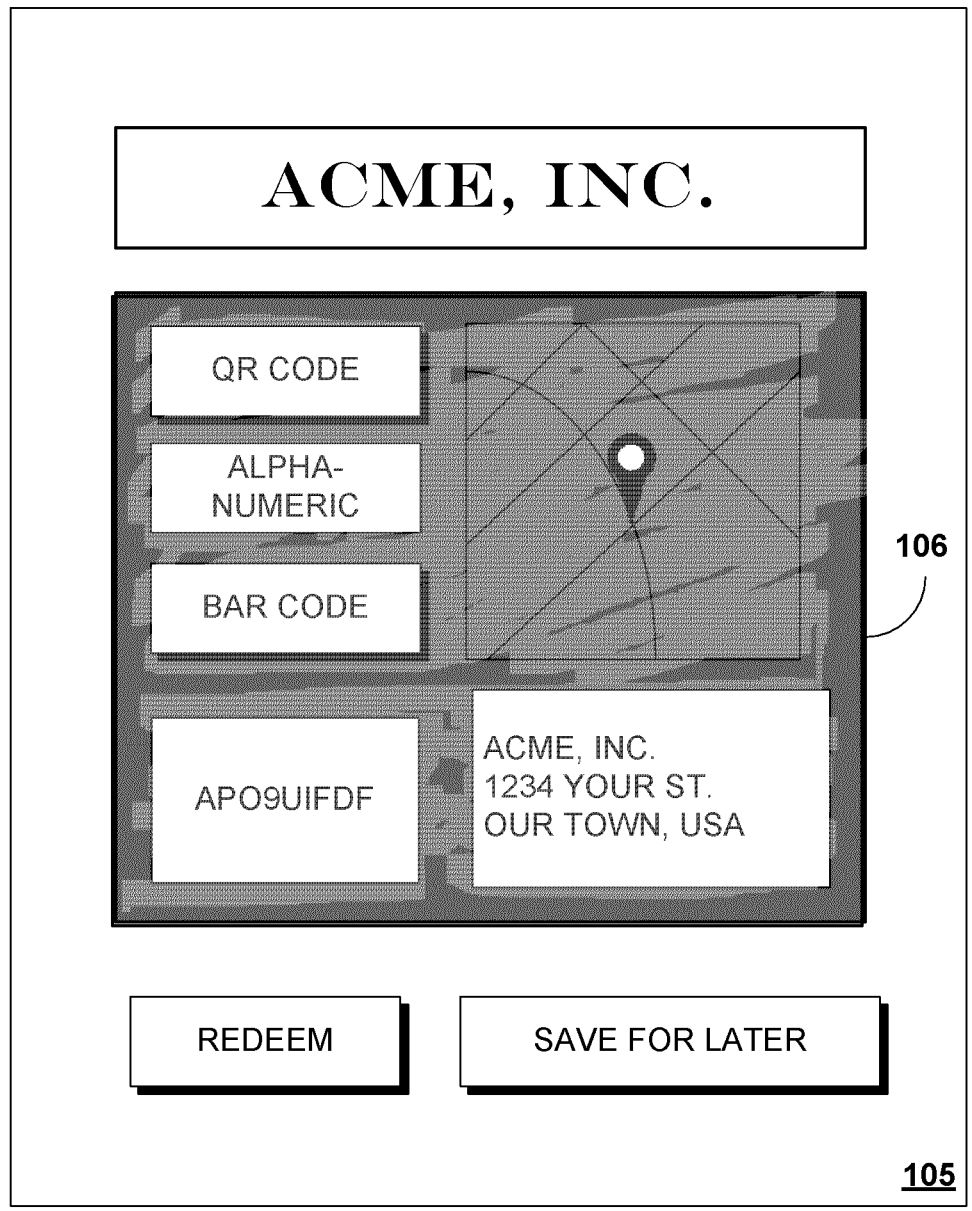
FIGS. 5-7 depict examples of mechanisms from which a user may select to redeem an offer conveyed in a graphic of a modular advertising unit, in accordance with various embodiments.
Figure 6:
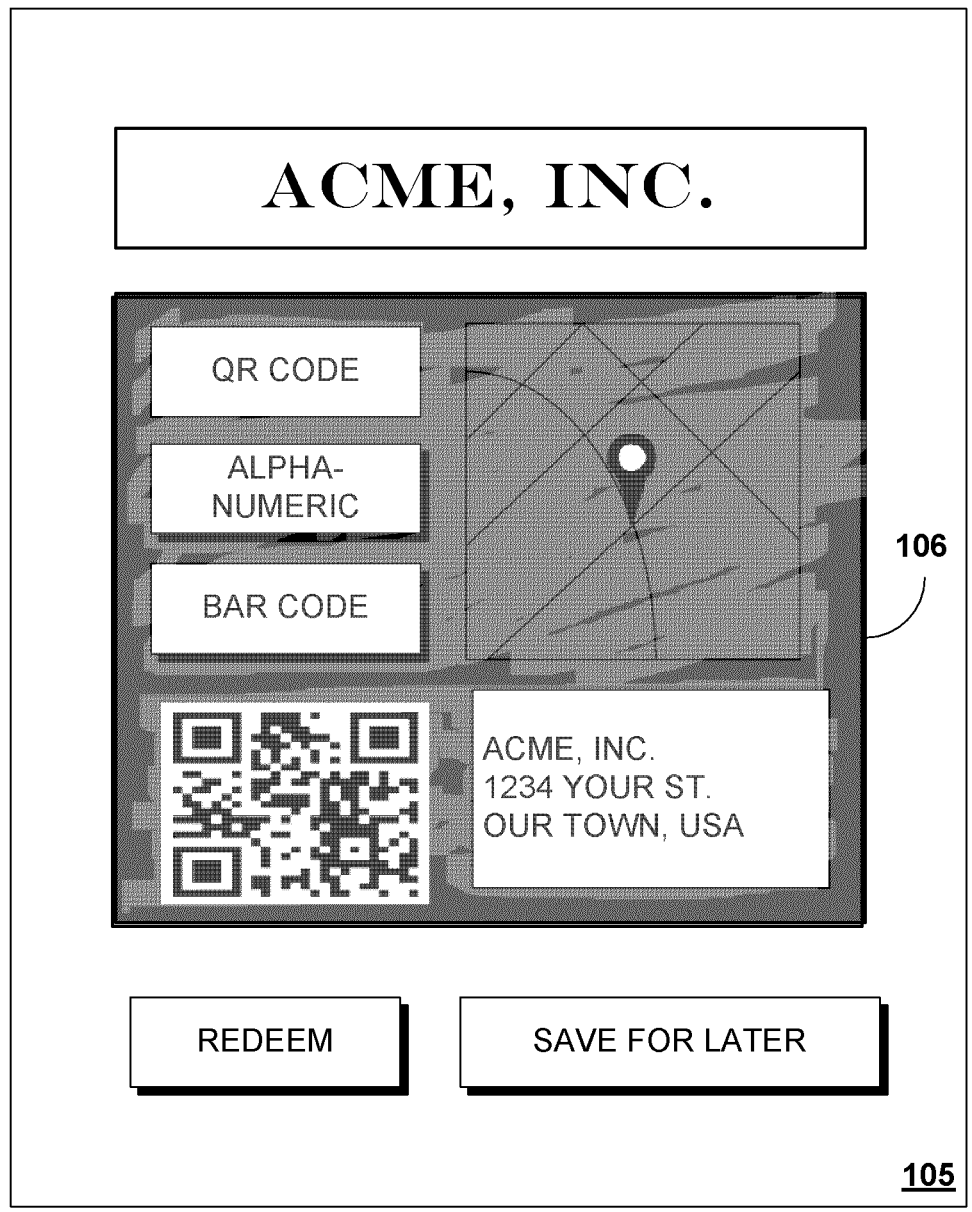
Figure 7:
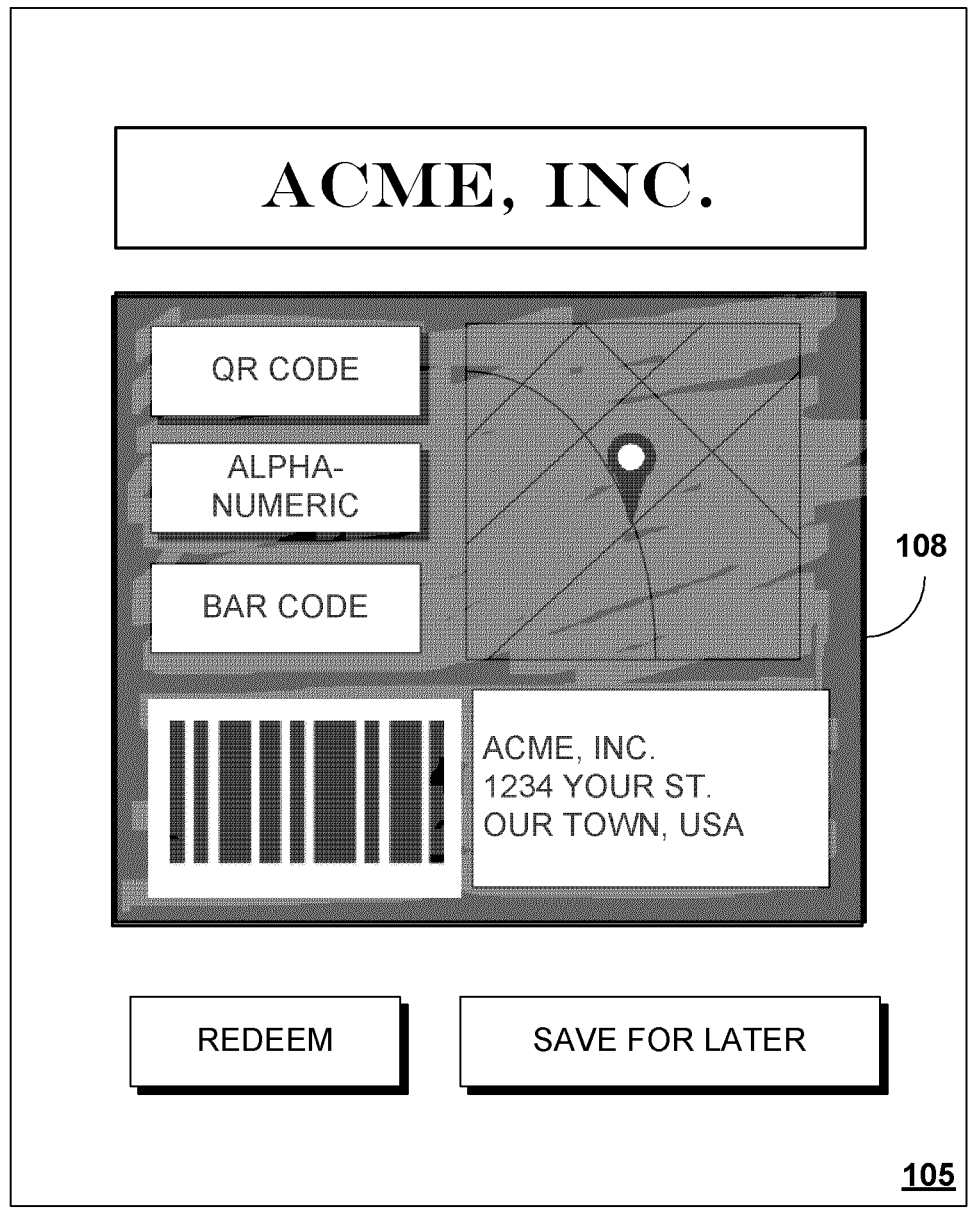

In various embodiments, modular advertising unit 105 may be configured with instructions that when executed, cause end user computing device 14 to enable selection by a user of a mechanism to redeem an offer made in the message. FIGS. 5-7 depict examples of how a user may select such a mechanism, in accordance with various embodiments. Three buttons are shown, each corresponding to a technology option that the user may select for use in redeeming an offer conveyed by second graphic 108. In FIG. 5, the button "Alpha Numeric Code" is selected, and so an alphanumeric code ("APO9UIFDF") is presented. In FIG. 6, the button "QR Code," which may stand for "Quick Response" code, is selected, and so a two-dimensional matrix barcode known as a QR code is depicted. In FIG. 7, the button "BarCode" is selected, and a standard barcode is depicted. In various embodiments, the user may select whichever option he or she prefers, and may cause an image having the selected code to be created, e.g., digitally (e.g., as a PDF or JPEG) or as a paper printout that the user may carry to the vendor for redemption. In some cases, vendors may be prepared to scan a code from a display of a user's phone, using bar code readers and so forth, which may avoid the need for printing.

Figure 8:
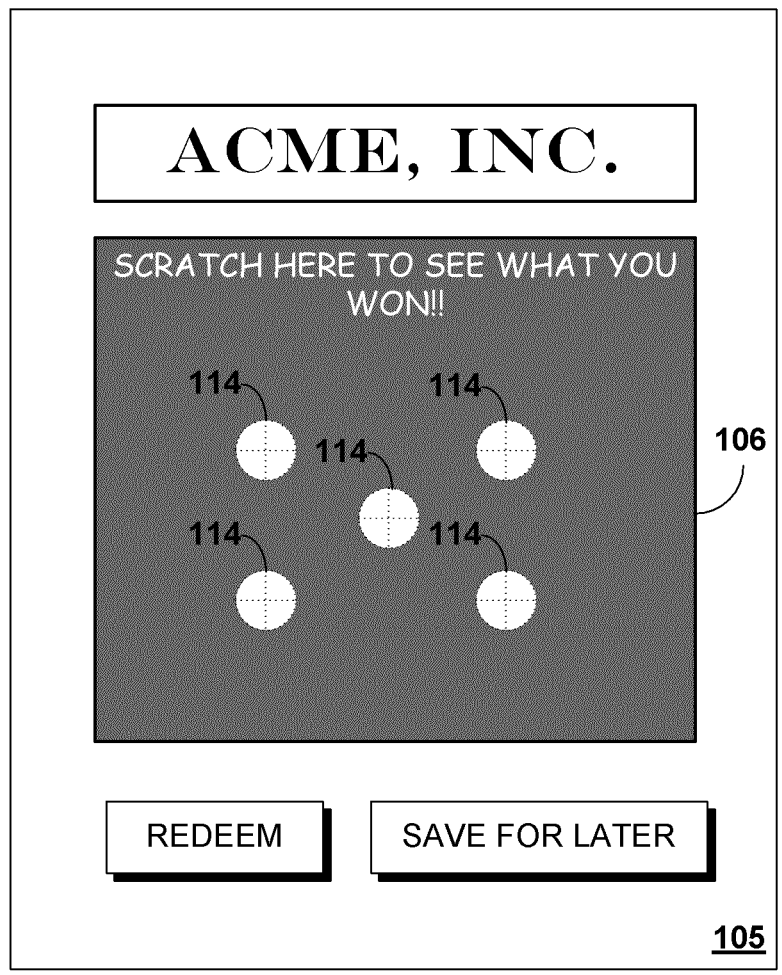
FIG. 8 depicts another example modular advertising unit with a plurality of predetermined checkpoints, in accordance with various embodiments.

Referring to FIG. 8, in various embodiments, modular advertising unit 105 may predefine one or more checkpoints 114, e.g., within first graphic 106. Checkpoints may be a predefined geometric coordinate within first graphic 106. In some cases, checkpoints 114 may include an area of a particular size surrounding a geometric coordinate. Modular advertising unit 105 may include instructions that, when executed, cause end user computing device 14 to detect user interaction with a checkpoint 114 (e.g., scratched some or all of an area surrounding a geometric coordinate, scratched at or within a particular distance of the geometric coordinate, etc.). While checkpoints 114 are depicted in FIG. 8, in various embodiments, checkpoints 114 may not actually be visible to an end user.

In various embodiments, detection of user interaction with one or more checkpoints 114 may constitute an event. Modular advertising unit 105 may include instructions that, when executed, cause end user computing device 14 to perform various actions in response to such an event. Various events may be caused by detection of various types of user interaction with one or more checkpoints 114. For example, user interaction with a sufficient number of checkpoints 114 (e.g., a majority) may cause an event to which end user computing device 14 responds by revealing at least a predefined portion, if not the entirety of, second graphic 108 in place of at least a portion of first graphic 106. As another example, user interaction with a predetermined sequence of checkpoints 114 in a particular order may cause an event to which end user computing device 14 responds by revealing an entire second graphic 108, or a particular second graphic 108 being selected (e.g., "WIN" if checkpoints 114 are scratched in the correct sequence, "LOSE" if checkpoints 114 are scratched in an incorrect sequence) from a plurality of candidate graphics. As another example, user interaction with a sufficient number of checkpoints 114 (e.g., a majority) may cause an event to which end user computing device 14 responds by revealing one or more user-operable buttons (e.g., save, redeem, share, etc.).

In various embodiments, modular advertising unit 105 may include instructions that, when executed, cause end user computing device 14 to automatically provide a report, e.g., to modular advertising creation platform 26 or another computing device associated with an advertising entity, about user interaction with one or more predefined checkpoints 114 within first graphic 106. Suppose a particular modular advertising unit 105 has several predefined checkpoints 114 defined in first graphic 106 that correspond to hints associated with a crossword puzzle. The more checkpoints the user scratches, the more hints she receives. This may lower her score. The score and/or a report of a number of hints the user scratched may be reported to a crossword puzzle game server, where the user's online score may be impacted (e.g., negatively if she required a relatively large number of hints). Additionally or alternatively, a report of which checkpoints 14 were interacted with may provide an indication, particularly when aggregated over a plurality of instances of modular advertising unit 105 distributed to a plurality of end users, of user interest in interacting with first graphic 106.

Figure 9:
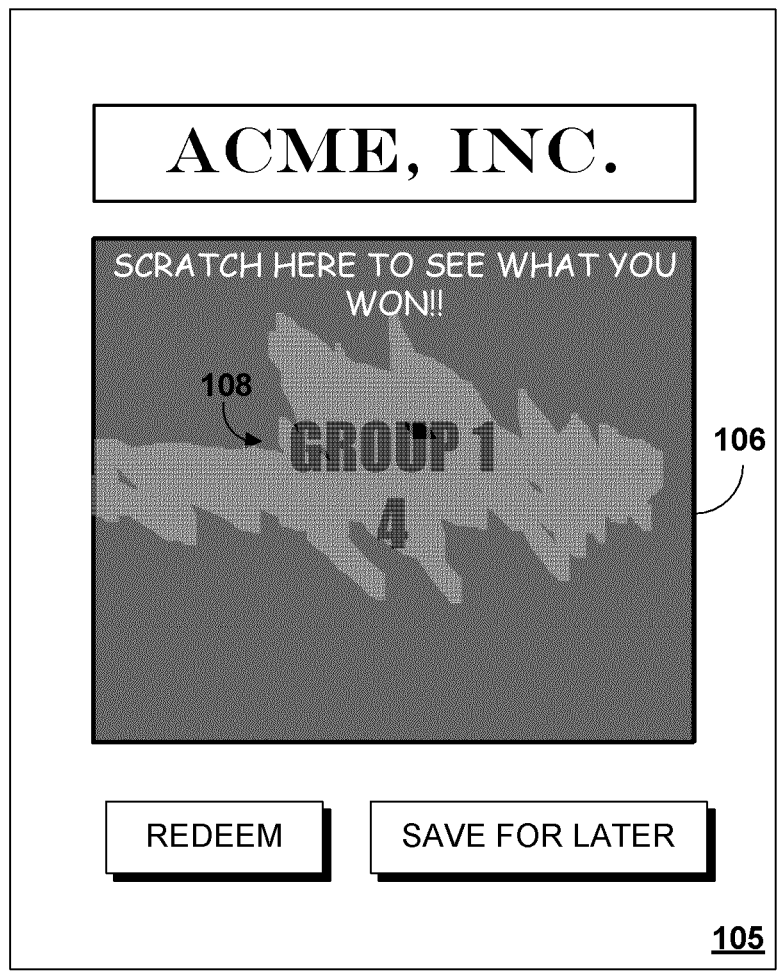
FIG. 9 depicts another example modular advertising unit with a graphic "scratched off" to reveal another graphic with a message, in accordance with various embodiments.

In various embodiments, modular advertising unit 105 may constitute a game piece in a larger online game. For instance, in FIG. 9, first graphic 106 of modular advertising unit 105 has been "scratched" to reveal second graphic 108, which includes a message, "GROUP 1 4." This may indicate that modular advertising unit 105 is a game piece in an online game or contest such as that depicted in FIG. 10.

Figure 10:
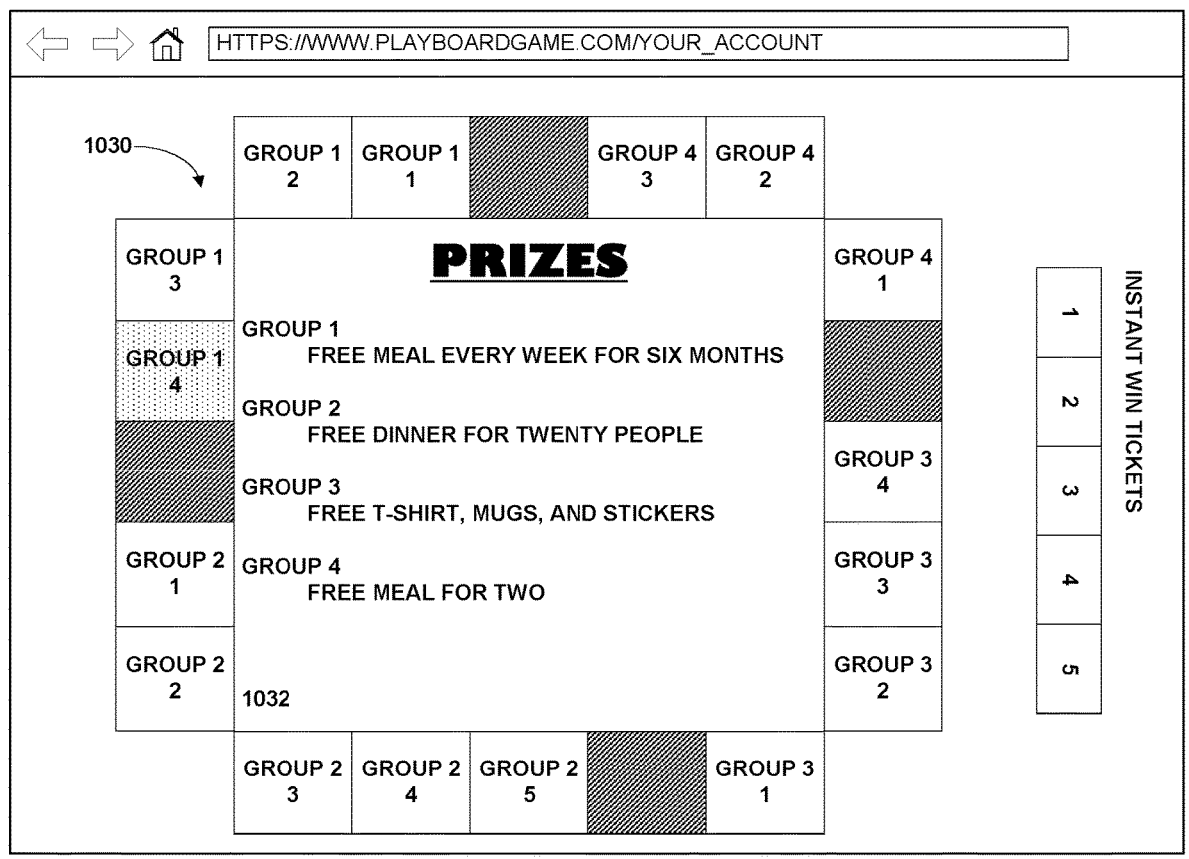
FIG. 10 depicts an online game that may be played using modular advertising units such as the one depicted in FIG. 9, in accordance with various embodiments.

Referring to FIG. 10, in various embodiments, an online game board 1030 may be provided, e.g., on a website as shown in FIG. 10 or as a standalone graphical user interface for an application program. Modular advertising unit 105 of FIG. 9 may be a piece that is "playable" on game board 1030. A middle portion 1032 of game board 1030 may describe the rules of this particular game, although this is not required and the rules may be explained elsewhere. In this example, a user may click on the "redeem" button of modular advertising unit 105 of FIG. 9, and that may cause the piece to be "played" on game board 1030, e.g., as part of an account the user established with a server (not shown) associated with game board 1030. In some cases, redeeming a game piece may cause a user's web browser to be automatically redirected to a web page containing game board 1030, so that the user may observe his or her progress in the online game.

In this example, modular advertising unit 105 is one of four pieces in GROUP 1, as indicated by the graying out of the corresponding piece on game board 1030. Should the user "collect" the other three pieces in this particular online gaming session, she may be eligible for a GROUP 1 prize of "FREE MEAL EVERY WEEK FOR SIX MONTHS." An online gaming session may last for any amount of time, such as days, weeks, hours, or some other period of time dictated by, for instance, a promotional contest or advertising campaign.

As noted above, in various embodiments, modular advertising unit 105 may include instructions that, when executed, cause end user computing device 14 or one of intermediate host servers 18-24 to obtain second graphic 108 contemporaneously with user download of and/or interaction with modular advertising unit 105. Accordingly, in various embodiments, an entity associated with an online game or contest may be able to adjust a probability that a particular game piece for the online game will be obtained at any point in time pre- or post-distribution.

An example method 1100 that may be implemented, e.g., by modular advertising creation platform 26, in accordance with various embodiments. Although these operations are shown in a particular order, this is not meant to be limiting. In various embodiments, various operations may be performed in a different order, and various operations may be added and/or omitted.

At operation 1102, generation of modular advertising unit 105 may be facilitated, e.g., by modular advertising creation platform 26. For example, modular advertising creation platform 26 may provide GUI 100 with which a user may interact to create and/or selectively distribute modular advertising unit 105. Facilitation of generation itself may include a variety of operations. For example, at operation 1104, first graphic 106 may be selectively incorporated (e.g., packaged) with modular advertising unit 105. At operation 1106, instructions configured to cause an end user computing device 14 to automatically provide a report about user operation of first graphic 106 may be incorporated, e.g., by modular advertising creation platform 26, into modular advertising unit 105. Similarly, at operation 1108, modular advertising creation platform 26 may incorporate into modular advertising unit 105 instructions configured to cause an end user computing device 14 or an intermediate host server 18-24 to obtain second graphic 108 from modular advertising creation platform 26, e.g., contemporaneously with download of modular advertising unit 105 or with operation of first graphic 106.

At operation 1110, instances of the generated modular advertising unit 105 may be selectively provided, e.g., by modular advertising creation platform 26, to a plurality of end user computing devices 14 over a plurality of communication channels. For instance, a user may use GUI 100 to select email and one or more webpages (e.g., as banner advertisement) as channels of communication to be used for distribution of modular advertising unit 105.

At operation 1112, a request for second graphic 108 may be received, e.g., by modular advertising creation platform 26, from an end user computing device 14 or an intermediate host server 18-24. At operation 1114, second graphic 108 may be stochastically selected, e.g., by modular advertising creation platform 26, from a plurality of candidate graphics based on a corresponding plurality of probabilities.

At operation 1116, a report on user operation of first graphic 106 associated with an instance of modular advertising unit 105 may be received, e.g., by modular advertising creation platform 26. For example, modular advertising unit 105 may include code that causes end user computing device 14, on execution of the instructions, to detect and gather data related to detection of user interaction with first graphic 106. Such a report may contain various information, including but not limited to a number and/or sequence of predefined checkpoints 114 interacted with by a user, an indication that the user did or did not scratch enough of first graphic 106 to reveal second graphic 108, length of time between download of modular advertising unit 105 and beginning/end of user interaction with first graphic 106, length of time of user interaction with first graphic 106, length of time between user interaction with various predefined checkpoints 114, and so forth.

At operation 1118, analysis of the report received at operation 1116 may be facilitated, e.g., by modular advertising creation platform 26. As noted above, this analysis may enable a user to, among other things, determine which channels of communication (e.g., email, text message, webpage, etc.) are more effective than others, analyze how users are interacting with a particular modular advertising unit (e.g., whether they're likely to scratch off first graphic 106), and so forth.

In various embodiments, taking various actions with second graphic 108 (e.g., clicking through an offer) by a user may cause the user to receive benefits beyond those conveyed by second graphic 108. For example, a user may be presented with an interface, e.g., after engaging and/or saving an offer, that enables the user to share modular advertising unit 105 with friends. The user may "earn" credit for the number of friends that the user invites to engage, or the number of the user's friends that actually engage modular advertising unit 105.

Figure 12:
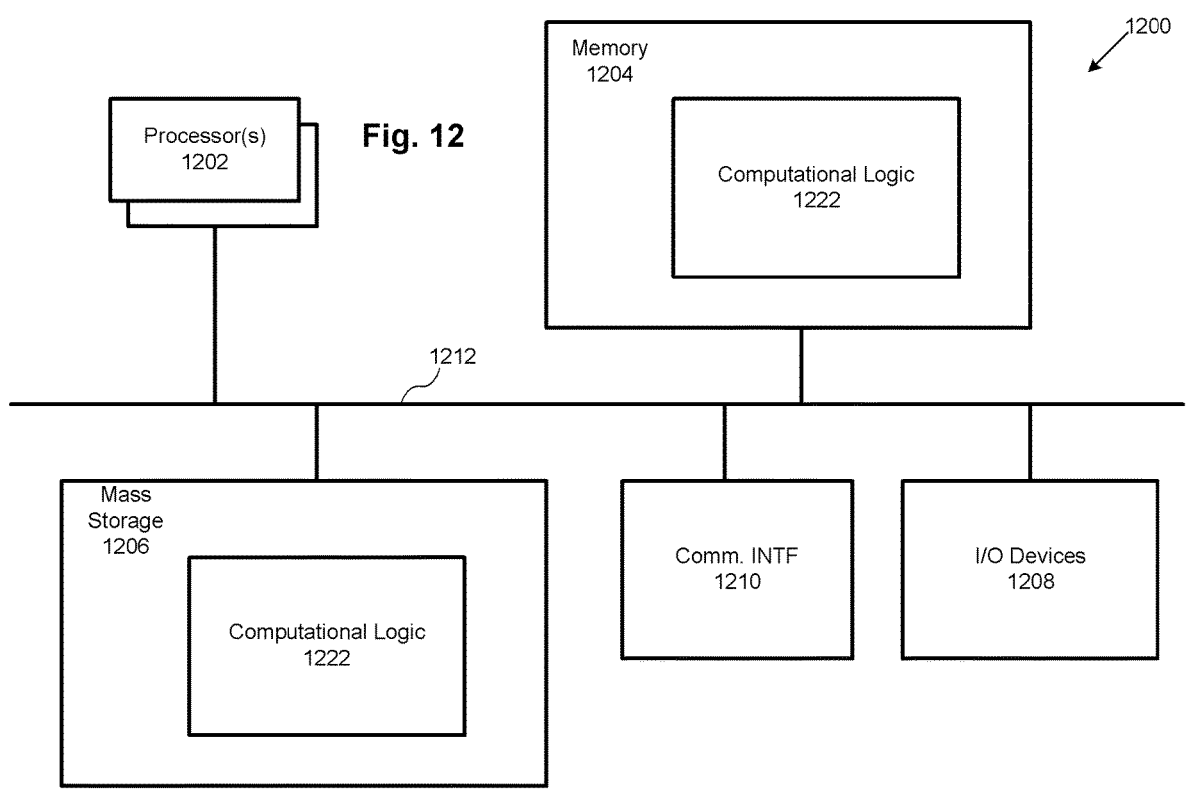
FIG. 12 depicts an example computing device on which various techniques described herein may be implemented, in accordance with various embodiments.

Referring now to FIG. 12, an example computer suitable for use for various components of FIG. 1 is illustrated in accordance with various embodiments. As shown, computer 1200 may include one or more processors or processor cores 1202, and system memory 1204. For the purpose of this application, including the claims, the terms "processor" and "processor cores" may be considered synonymous, unless the context clearly requires otherwise. Additionally, computer 1200 may include mass storage devices 1206 (such as diskette, hard drive, compact disc read only memory (CD-ROM) and so forth), input/output devices 1208 (such as display, keyboard, cursor control, remote control, gaming controller, image capture device, and so forth) and communication interfaces 1210 (such as network interface cards, modems, infrared receivers, radio receivers (e.g., Bluetooth), and so forth). The elements may be coupled to each other via system bus 1212, which may represent one or more buses. In the case of multiple buses, they may be bridged by one or more bus bridges (not shown).

Each of these elements may perform its conventional functions known in the art. In particular, system memory 1204 and mass storage devices 1206 may be employed to store a working copy and a permanent copy of the programming instructions implementing the operations associated with modular advertising creation platform 26, end user computing device 14, intermediate host servers 18-24, as well as selected operations shown in FIG. 11. The various elements may be implemented by assembler instructions supported by processor(s) 1202 or high-level languages, such as, for example, C, that can be compiled into such instructions.

The permanent copy of the programming instructions may be placed into permanent mass storage devices 1206 in the factory, or in the field, through, for example, a distribution medium (not shown), such as a compact disc (CD), or through communication interface 1210 (from a distribution server (not shown)). That is, one or more distribution media having an implementation of the agent program may be employed to distribute the agent and program various computing devices.

The number, capability and/or capacity of these elements 1210-1212 may vary, depending on whether computer 1200 is used as a modular advertising creation platform 26, end user computing device 14 or an intermediate host server 18-24. Their constitutions are otherwise known, and accordingly will not be further described.

Figure 11:
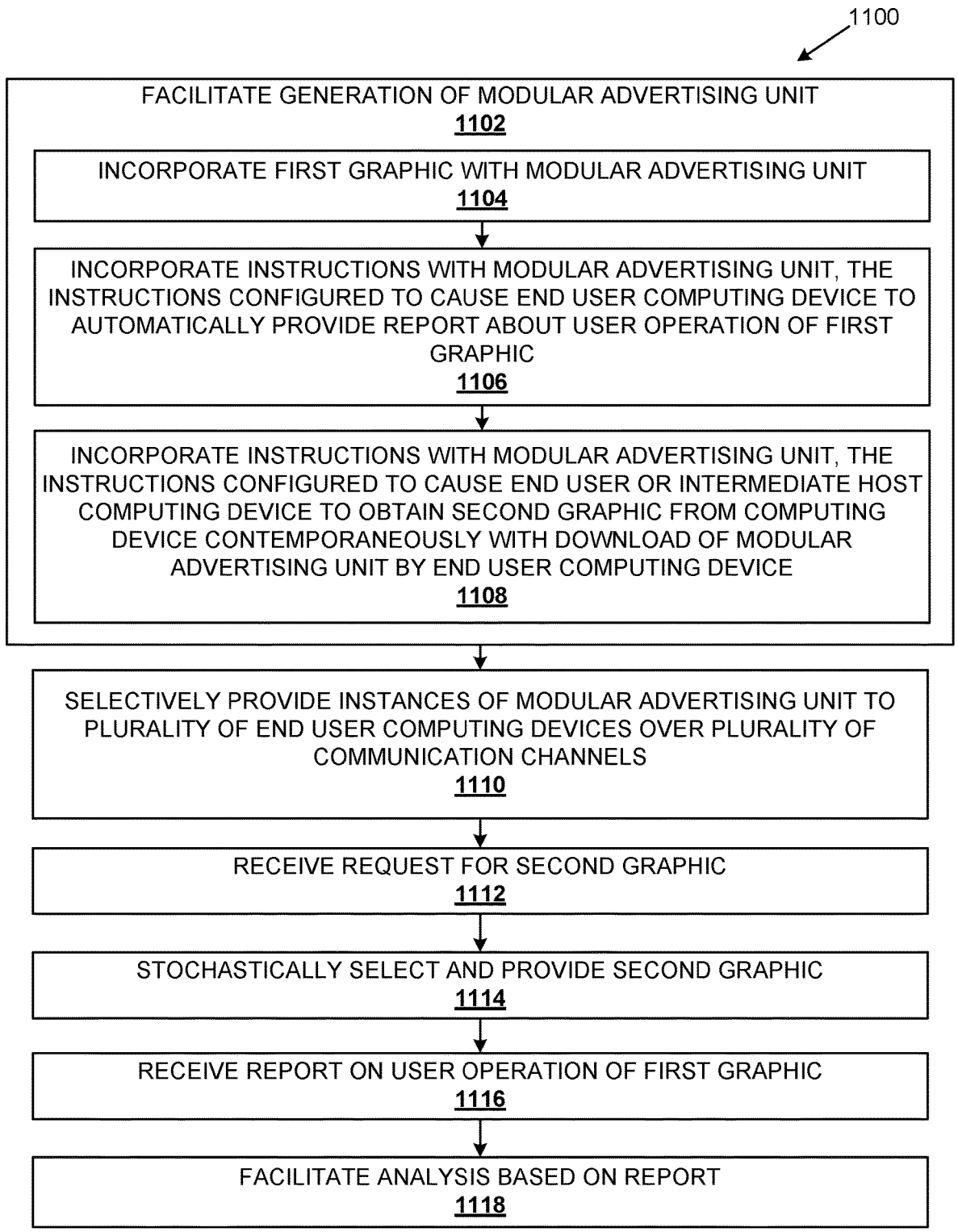
FIG. 11 depicts an example process that may be implemented on various components described herein, in accordance with various embodiments.

For one embodiment, at least one of processors 1202 may be packaged together with computational logic 1222 configured to practice aspects of method 1100 of FIG. 11. For one embodiment, at least one of processors 1202 may be packaged together with computational logic 1222 configured to practice aspects of method 1100 of FIG. 11 to form a System in Package (SiP). For one embodiment, at least one of processors 1202 may be integrated on the same die with computational logic 1222 configured to practice aspects of method 1100 of FIG. 11. For one embodiment, at least one of processors 1202 may be packaged together with computational logic 1222 configured to practice aspects of method 1100 of FIG. 11 to form a System on Chip (SoC). For at least one embodiment, the SoC may be utilized in, e.g., but not limited to, a computing tablet.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein.

What is claimed is:

1. A computer-implemented method performed by an end user computing device, the method comprising:
   downloading a modular reveal-based digital media content unit from a source computing device, the modular reveal-based digital media content unit including a first graphic, a plurality of predefined checkpoints having a two-dimensional arrangement within the first graphic, and instructions executable by the end user computing device;
   executing the instructions at the end user computing device;
   responsive to executing the instructions, the end user computing device:
      requesting a second graphic from a remote computing device contemporaneously with the download of the modular reveal-based digital media content unit;
      receiving the second graphic requested by the end user computing device;
      presenting the first graphic via a display device of the end user computing device in which the plurality of predefined checkpoints are not visible within the first graphic presented via the display device;
      detecting user interaction with at least a portion of the first graphic;
      responsive to detecting the user interaction with at least the portion of the first graphic, revealing a portion of the second graphic in place of the portion of the first graphic presented via the display device, the second graphic including a hidden message;
      detecting a quantity of the plurality of predefined checkpoints of the first graphic interacted with by the user interaction;
      responsive to detecting the user interaction with at least the portion of the first graphic, automatically providing a report to the source computing device or to another computing device, the report indicating the quantity of the plurality of predefined checkpoints interacted with by the user interaction;
      detecting whether the quantity of the plurality of predefined checkpoints interacted with by the user interaction is at least a threshold quantity of predefined checkpoints within the first graphic; and
      responsive to detecting the user interaction as further including interaction with at least the threshold quantity of predefined checkpoints within the first graphic, revealing one or more user-operable buttons via the display device that are operable by a user to present, via the display device, a redemption code having a redemption code type selected by the user from a plurality of different redemption code types.

2. The method of claim 1, wherein the one or more user-operable buttons or links are revealed outside of a region containing the first graphic and/or the second graphic.

3. The method of claim 1, wherein the threshold quantity of checkpoints includes at least a majority of the plurality of predefined checkpoints.

4. The method of claim 1, wherein the report further indicates a time elapsed between presentation of the first graphic and the revealing of the portion of the second graphic.

5. The method of claim 1, wherein the report further indicates a duration of time for the user interaction with the first graphic.

6. The method of claim 1, wherein the report further indicates whether the user operated the one or more user-operable buttons or links.

7. The method of claim 1, wherein the plurality of redemption code types from which the redemption code type of the redemption code is selected by the user include two or more of the following: a bar code, a QR code, an alphanumeric code.

8. The method of claim 1, wherein the modular reveal-based digital media content unit is downloaded via a webpage, email, instant messaging, or text messaging.

9. A computing system, comprising:
   a source computing device having computer-readable source instructions and a modular reveal-based digital media content unit stored thereon, the source instructions executable by the source computing device to:
      provide the modular reveal-based digital media content unit for download to an end user computing device, the modular reveal-based digital media content unit including a first graphic, a plurality of predefined checkpoints having a two-dimensional arrangement within the first graphic, and end user instructions executable by the end user computing device, the end user instructions executable by the end user computing device to:
         request a second graphic from a remote computing device different from the source computing device contemporaneously with download of the modular reveal-based digital media content unit;
         present the first graphic via a display device of the end user computing device in which the plurality of predefined checkpoints are not visible within the first graphic presented via the display device;
         detect user interaction with at least a portion of the first graphic;
         responsive to detecting the user interaction with at least the portion of the first graphic, reveal a portion of the second graphic in place of the portion of the first graphic presented via the display device, the second graphic including a hidden message;
         detect a quantity of the plurality of predefined checkpoints of the first graphic interacted with by the user interaction;
         responsive to detecting the user interaction with at least the portion of the first graphic, automatically provide a report to the source computing device or to another computing device, the report indicating the quantity of the plurality of predefined checkpoints interacted with by the user interaction;
         detect whether the quantity of the plurality of predefined checkpoints interacted with by the user interaction is at least a threshold quantity of predefined checkpoints within the first graphic; and
         responsive to detecting the user interaction as further including interaction with at least the threshold quantity of predefined checkpoints within the first graphic, reveal one or more user-operable buttons or links via the display device that are operable by a user to initiate a selected action of a plurality of different actions with respect to the hidden message of the second graphic, the plurality of different actions including the end user computing device connecting with a network service and presenting one or more redemption codes via the display device.

10. The computing system of claim 9, wherein the one or more user-operable buttons or links are revealed outside of a region containing the first graphic and/or the second graphic.

11. The computing system of claim 9, wherein the threshold quantity of checkpoints includes at least a majority of the plurality of predefined checkpoints.

12. The computing system of claim 9, wherein the report further indicates a time elapsed between presentation of the first graphic and the revealing of the portion of the second graphic.

13. The computing system of claim 9, wherein the report further indicates a duration of time for the user interaction with the first graphic.

14. The computing system of claim 9, wherein the report further indicates whether the user operated the one or more user-operable buttons or links.

15. The computing system of claim 9, wherein the redemption code is selected from a bar code, a QR code, and an alphanumeric code.

16. The computing system of claim 9, wherein the modular reveal-based digital media content unit is downloaded via a webpage, email, instant messaging, or text messaging.

17. The computing system of claim 9, wherein the source instructions are further executable by the source computing device to:
receive the report from the end user computing device; and
provide a graphical user interface that includes contents of the report, including the quantity of the plurality of predefined checkpoints interacted with by the user interaction.

18. The computing system of claim 9, further comprising the end user computing device.

19. A computer-implemented method performed by a source computing device, the method comprising:
providing the modular reveal-based digital media content unit for download to an end user computing device, the modular reveal-based digital media content unit including a first graphic, a plurality of predefined checkpoints having a two-dimensional arrangement within the first graphic, and instructions executable by the end user computing device, the first graphic including a plurality of predefined checkpoints having a two-dimensional arrangement within the first graphic, the instructions executable by the end user computing device to:
request a second graphic from a remote computing device different from the source computing device contemporaneously with download of the modular reveal-based digital media content unit,
present the first graphic via a display device of the end user computing device in which the plurality of predefined checkpoints are not visible within the first graphic presented via the display device,
detect user interaction with at least a portion of the first graphic,
responsive to detecting the user interaction with at least the portion of the first graphic, reveal a portion of the second graphic in place of the portion of the first graphic presented via the display device, the second graphic including a hidden message,
detect a quantity of the plurality of predefined checkpoints of the first graphic interacted with by the user interaction,
responsive to detecting the user interaction with at least the portion of the first graphic, automatically provide a report to the source computing device or to another computing device, the report indicating the quantity of the plurality of predefined checkpoints interacted with by the user interaction,
detect whether the quantity of the plurality of predefined checkpoints interacted with by the user interaction is at least a threshold quantity of predefined checkpoints within the first graphic, and
responsive to detecting the user interaction as further including interaction with at least the threshold quantity of predefined checkpoints within the first graphic, reveal one or more user-operable buttons or links via the display device that are operable by a user to initiate an action with respect to the hidden message of the second graphic, the action including presenting, via the display device, a redemption code selected by the user from at least a bar code, a QR code, and an alphanumeric code;
receiving the report at the source computing device from the end user computing device; and
providing a graphical user interface at the source computing device that includes contents of the report, including the quantity of the plurality of predefined checkpoints interacted with by the user interaction.

* * * * *